(12) United States Patent
Griffiths (10) Patent No.: US 12,457,928 B2
(45) Date of Patent: Nov. 4, 2025

(54) MOWER BLADE WITH REMOVABLE CUTTING ATTACHMENTS

(71) Applicant: Kevon Griffiths, Deltona, FL (US)

(72) Inventor: Kevon Griffiths, Deltona, FL (US)

(*) Notice: Subject to any disclaimer, the term of this patent is extended or adjusted under 35 U.S.C. 154(b) by 753 days.

(21) Appl. No.: 17/687,334

(22) Filed: Mar. 4, 2022

(65) Prior Publication Data

US 2023/0276732 A1    Sep. 7, 2023

(51) Int. Cl.
*A01D 34/73* (2006.01)
*A01D 101/00* (2006.01)

(52) U.S. Cl.
CPC ........ *A01D 34/733* (2013.01); *A01D 2101/00* (2013.01)

(58) Field of Classification Search
CPC .... A01D 34/733; A01D 34/003; A01D 34/13; A01D 34/63; A01D 2101/00
See application file for complete search history.

(56) References Cited

U.S. PATENT DOCUMENTS

| | | | | |
|---|---|---|---|---|
| 2,863,162 A * | 12/1958 | Draughon | ............. | A01D 42/08 37/243 |
| 3,093,952 A * | 6/1963 | Bonser | ................. | A01D 34/73 56/255 |
| 3,321,894 A * | 5/1967 | Ingram | ................. | A01D 34/63 56/295 |
| 3,574,272 A * | 4/1971 | Krewson | .............. | A01D 34/63 56/320.2 |
| 5,019,113 A * | 5/1991 | Burnell | ................ | A01D 34/733 56/DIG. 17 |
| 11,877,535 B2 * | 1/2024 | Payne | .................. | A01D 34/733 |
| 2004/0098960 A1 * | 5/2004 | Csonka | ................ | A01D 34/73 56/295 |
| 2022/0183228 A1 * | 6/2022 | Payne | .................. | A01D 34/733 |

FOREIGN PATENT DOCUMENTS

KR        101535279 B1 *   7/2015   ........... A01D 34/733

* cited by examiner

*Primary Examiner* — Joseph M Rocca
*Assistant Examiner* — Sunny D Webb
(74) *Attorney, Agent, or Firm* — Jason T. Daniel, Esq.; Daniel Law Offices, P.A.

(57) ABSTRACT

A mower blade device includes an elongated central frame having a top surface, a bottom surface, a first end and a second end. A spindle bolt hole is positioned along the center of the frame for connecting the frame to a lawn mower. A pair of cutting attachments are connected onto the first and second ends of the frame. Each of the cutting attachments including a leading edge having a sharpened cutting surface. The first and second cutting attachments can include identical shaped and sized cutting surfaces or dissimilar shaped and sized cutting surfaces. A cleaning brush attachment includes an elongated bracket and an n-shaped frame having a plurality of bristles extending outward therefrom. The bracket is removably connected to the bottom end of the central frame to permit the bristles to clean the blade housing of a lawn mower to which the device is connected.

17 Claims, 8 Drawing Sheets

MOWER BLADE WITH REMOVABLE CUTTING ATTACHMENTS

TECHNICAL FIELD

The present invention relates generally to lawn mowing blades, and more particularly to a lawn mower blade having removeable cutting attachments.

BACKGROUND

The statements in this section merely provide background information related to the present disclosure and may not constitute prior art.

Traditional lawn mower blades are constructed from a single piece of hardened steel or other such metal which are connected to a lawn mowing apparatus via small openings in the middle of the blade. As the blade spins, the cutting surfaces which are located along the leading edge of the outer ends of the blade make contact with the grass or other vegetation to cut the same.

Over time, these cutting surfaces become dull from repeated use. Because the blades are constructed from a single piece of metal, users have no choice but to replace the entire blade with a new one. However, it is noted that the actual cutting surface of a lawn mower blade only represents about 30 percent of the total length of the blade itself. For example, an 18" lawn mower blade has two distinct cutting surfaces of about 3" each, which extend inward from both ends of the blade. Therefore, discarding whole blades represents a tremendous amount of waste.

In addition to the above, different jobs require different types of mower blades, depending on the type of vegetation being cut and/or the length of the same. As such, workers must periodically change the blades of the mower in the field. This process can be time consuming as some blades utilize spindle connectors that require specialized tools.

Accordingly, it would be beneficial to provide a mower blade assembly having removeable cutting attachments that can be changed and/or replaced as needed to overcome the drawbacks described above.

SUMMARY OF THE INVENTION

The present invention is directed to a mower blade with removable cutting attachments. One embodiment of the present invention can include an elongated central frame having a top surface, a bottom surface, a first end and a second end. A spindle bolt hole can be positioned along the center of the frame for connecting the frame to a lawn mower, and a pair of spacer holes can be located on each side of the spindle hole.

In one embodiment, a pair of cutting attachments can be bolted onto the ends of the frame. Each of the cutting attachments can include a first end for connecting to one end of the frame, a leading edge and a trailing edge. Sharpened cutting surfaces can be located along each leading edge for cutting vegetation.

In one embodiment, each of the cutting attachments can include an identical shape, and one of the cutting attachments can be connected to the frame in an inverted orientation relative to the other. In one embodiment, the cutting surface of one or both of the cutting attachments can include different shapes, raised edges and sharpened surfaces.

In one embodiment, a cleaning brush attachment can include an elongated bracket and a generally n-shaped frame having a plurality of bristles extending outward therefrom.

The bracket can be removably connected to the bottom end of the central frame to permit the bristles to clean the blade housing of a lawn mower to which the device is connected.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include various hardware such as nuts and bolts, along with other items such as buckles, compression fittings, latches, hooks, snaps or buttons, among others, for example.

FIGS. 1-8 illustrate one embodiment of a mower blade with removable cutting attachments 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown throughout the drawings, the device 10 can include, essentially, a central frame member 20 having a pair of removable cutting attachments 30 and 30' and/or a cleaning brush attachment secured thereto.

Figure 1:
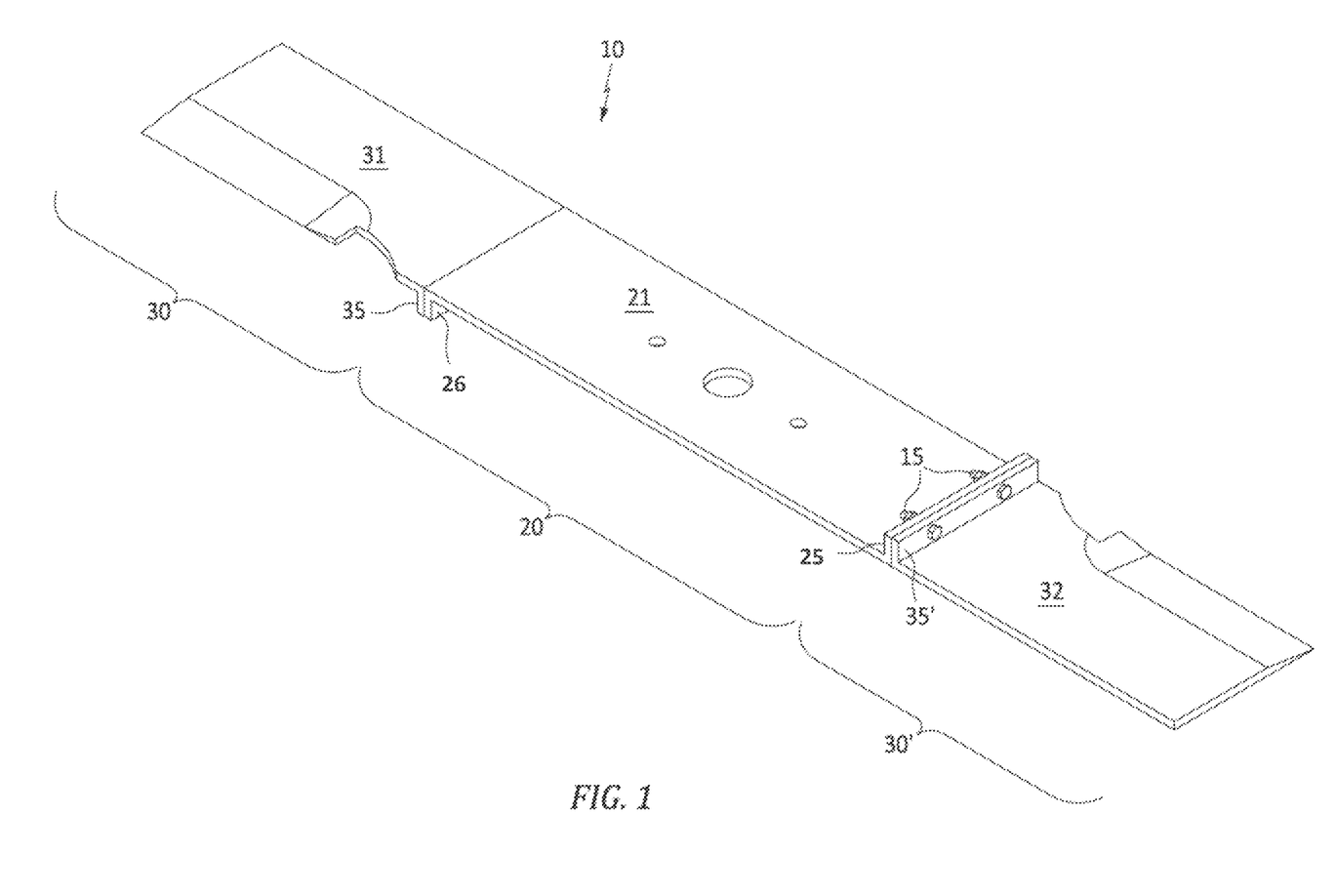
FIG. 1 is a perspective view of a mower blade device with removable cutting attachments that is useful for understanding the inventive concepts disclosed herein.
Figure 2:
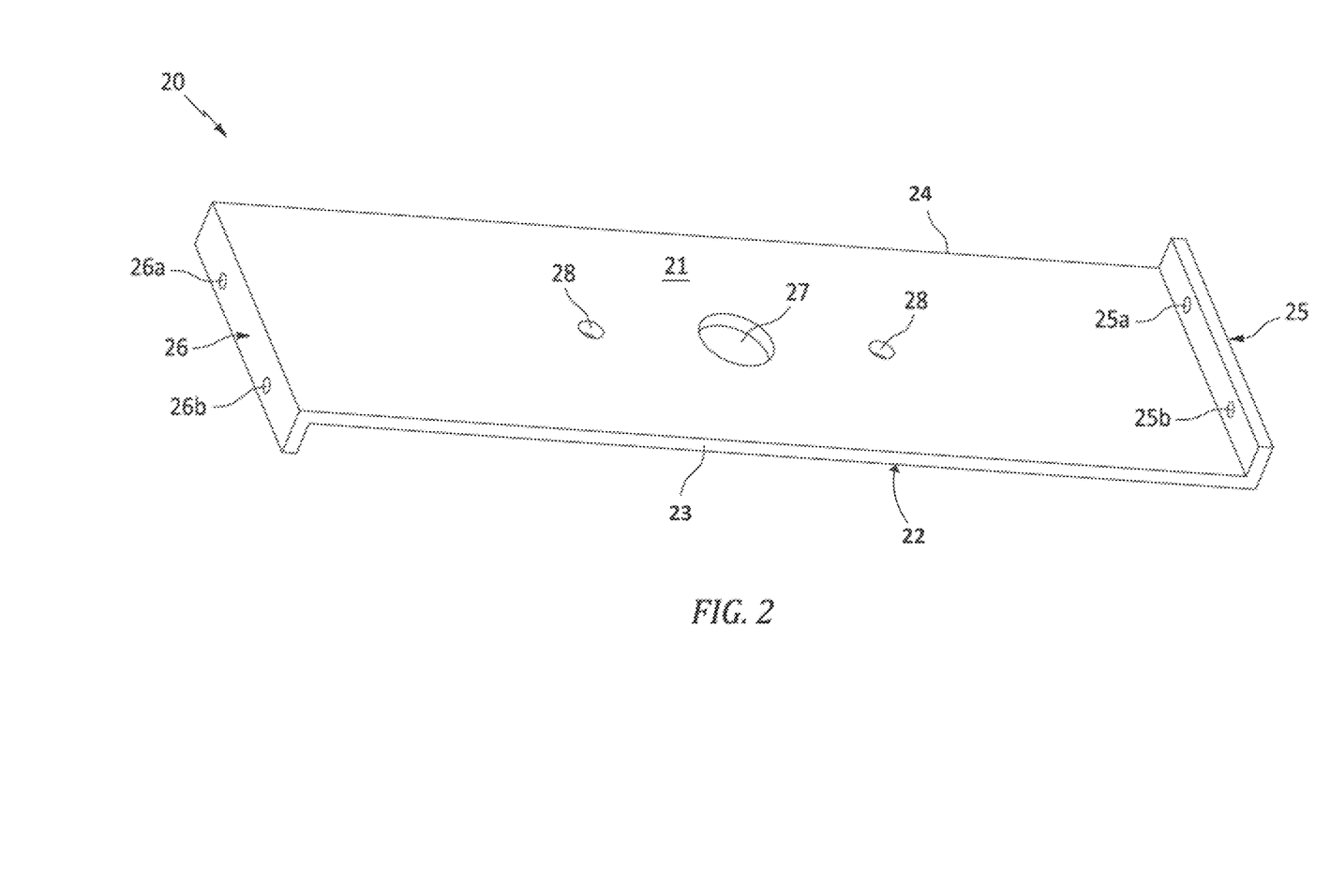
FIG. 2 is a perspective view of the central frame of the device, in accordance with one embodiment of the invention.

As shown best at FIG. 2, one embodiment of the central frame 20 can include an elongated body section having a top surface 21 a bottom surface 22, a first edge 23, a second edge 24, a first end 25 and a second end 26. As shown and described, the first and second ends of the frame are designed to engage and receive removeable cutting attachments. As such, in the preferred embodiment, the first end 25 and the second end 26 can each include a generally rectangular-shaped protrusion that extends orthogonally away from the top surface 21 and the bottom surface 22, respectively. Each of the ends 25 and 26 also including a pair of apertures 25a-25b, and 26a-26b, respectively.

In the preferred embodiment, the frame can be constructed from a single piece of steel or other hardened metal, for example, however other construction materials are also contemplated. Additionally, other embodiments are contemplated wherein the protruding ends 25 and 26 are constructed separately and are subsequently welded, bolted or otherwise secured onto the frame body.

In either instance, the frame can include a center hole 27 and a pair of alignment holes 28a and 28b along either side. As described herein, the center hole 27 can include any number of different shapes and sizes such as circular, 6-star, 5-star, bow tie H pattern, 6-point spindle or triangular spindle, for example, so as to receive a connector such as an elongated reverse-thread bolt and/or a universal collar for engaging the spindle of any type of mower.

Once secured thereto, the mower will spin the device 10 to permit the cutting attachments to engage and cut grass or other vegetation. As such, the frame and below described cutting attachments can be constructed to include different lengths and sizes so as to operate with any type of mower and can be used in a single-blade or multi-blade configuration.

Figure 3:
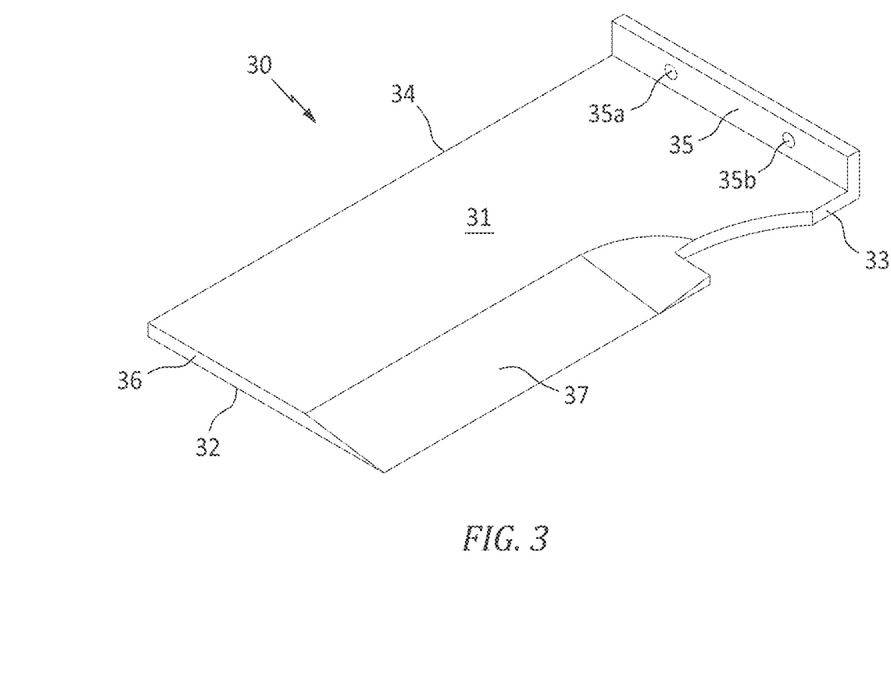
FIG. 3 is a top view of one of the mower blade attachments of the device, in accordance with one embodiment of the invention.

FIG. 3 illustrates one embodiment of a cutting attachment 30 that can be removably secured along either end 25 or 26 of the above-described frame 20. As shown, the removeable attachment can include a top surface 31, a bottom surface 32, a leading edge 33, a trailing edge 34, a first end 35, a second end 36 and a cutting surface 37 positioned along the leading edge.

As described herein, the cutting surface 37 can be sharpened so as to include a thin (e.g., 1-2 mm) sharp wedge that functions to chop/sever vegetation and other items to which it makes contact, and the cutting attachment 30 can be constructed from any number of different materials such as steel, for example, however other hardened materials are also contemplated.

In one embodiment, the first end 35 can include a generally rectangular-shaped member that extends orthogonally from the top surface 31 and can include a pair of apertures 35a and 35b. In the preferred embodiment, the first end 35 will include a shape and size that is complementary to the shape and size of the above described ends 25 and 26. Additionally, apertures 35a-35b will include a shape, size and location along the first end 35 that is complementary to the shape size and location of apertures 25a-25b and 26a-26b located along ends 25 and 26, respectively.

Although illustrated with regard to a flat cutting surface 37 in FIG. 3, this is for illustrative purposes only. To this end, other embodiments are contemplated wherein the cutting attachment includes a cutting edge having a different shape and/or size for performing specialized work.

Figure 4:
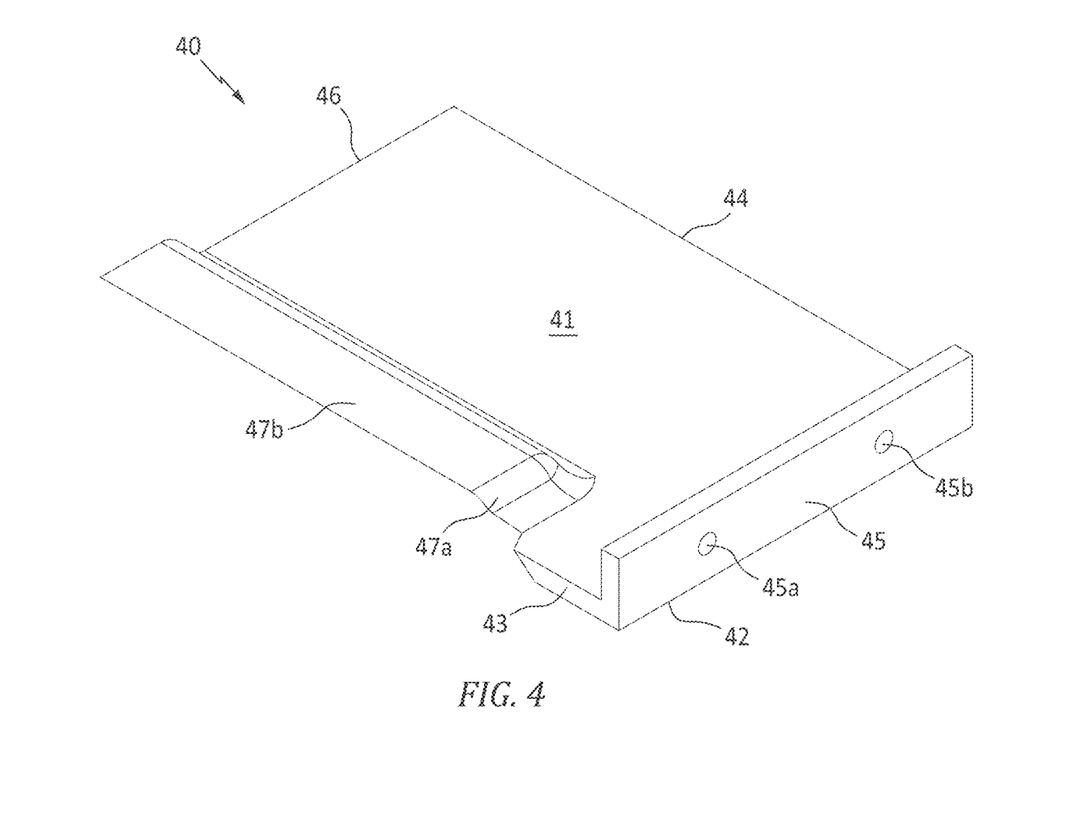
FIG. 4 is a perspective view of one of the mower blade attachments of the device, in accordance with one embodiment of the invention.

For example, FIG. 4 illustrates one embodiment of a cutting attachment that also includes a top surface 41, a bottom surface 42, a leading edge 43, a trailing edge 44, a first end 45, a second end 46 and a cutting surface that is positioned along the leading edge. In one embodiment, first end 45 includes an identical shape and size as first end 35, and also includes apertures 45a and 45b having identical shapes, sizes and locations as apertures 35a and 35b, respectively.

In the illustrated embodiment, the cutting surface includes one or more curvilinear portions 47a and a raised edge 47b extending toward the end of the attachment 46. The curvilinear portion(s) 47a can be constructed to include various angles to form a "high lift" blade attachment, a "low lift" blade attachment, or a "mulching" blade attachment which are specially designed for cutting tall grass (e.g., grass over 3"), short grass (e.g., grass under 3") or mulching the grass clippings, respectively. The terms "high lift" blade, "low lift" blade, and "mulching" blade are well known in the art.

Figure 5:
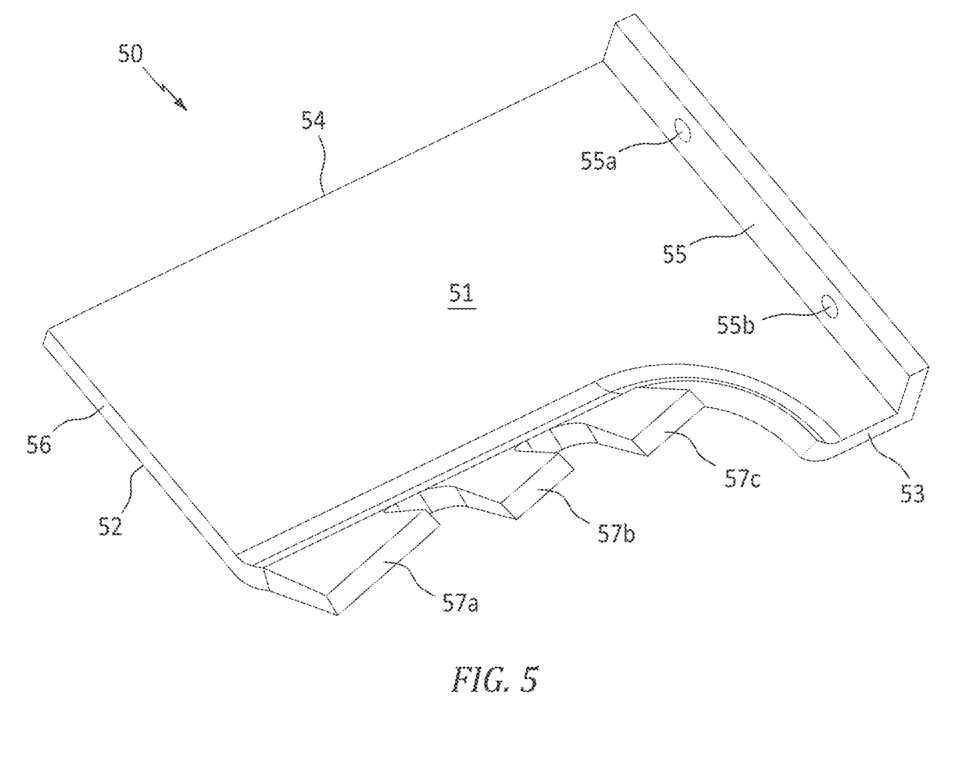
FIG. 5 is another perspective view of one of the mower blade attachments of the device, in accordance with one embodiment of the invention.

Likewise, FIG. 5 illustrates one embodiment of a cutting attachment 50 that also includes a top surface 51, a bottom surface 52, a leading edge 53, a trailing edge 54, a first end 55, a second end 56 and a cutting surface that is positioned along the leading edge. In one embodiment, first end 55 includes an identical shape and size as first end 35, and also includes apertures 55a and 55b having identical shapes, sizes and locations as apertures 35a and 35b, respectively.

In the illustrated embodiment, the cutting surface includes a plurality of serrations 57a, 57b and 57c, for example. Each edge of the serrations can be oriented at any number of different angles, so as to form a mulching blade attachment for shredding leaves and other such materials. Of course, other embodiments are contemplated wherein the cutting surface includes different shapes, sizes and/or intended uses from that described above.

Returning to FIG. 1, the device 10 can be assembled using two identical cutting attachments e.g., 30 and 30'. In this regard, the first end of each cutting attachment 35 and 35' can be positioned against the ends 25 and 26 of the frame 20, respectively. When so positioned, attachment 35 will be upside down relative to 35', and connectors 15 such as the illustrated nuts and bolts can be secured through the respective apertures which are aligned.

Figure 6:
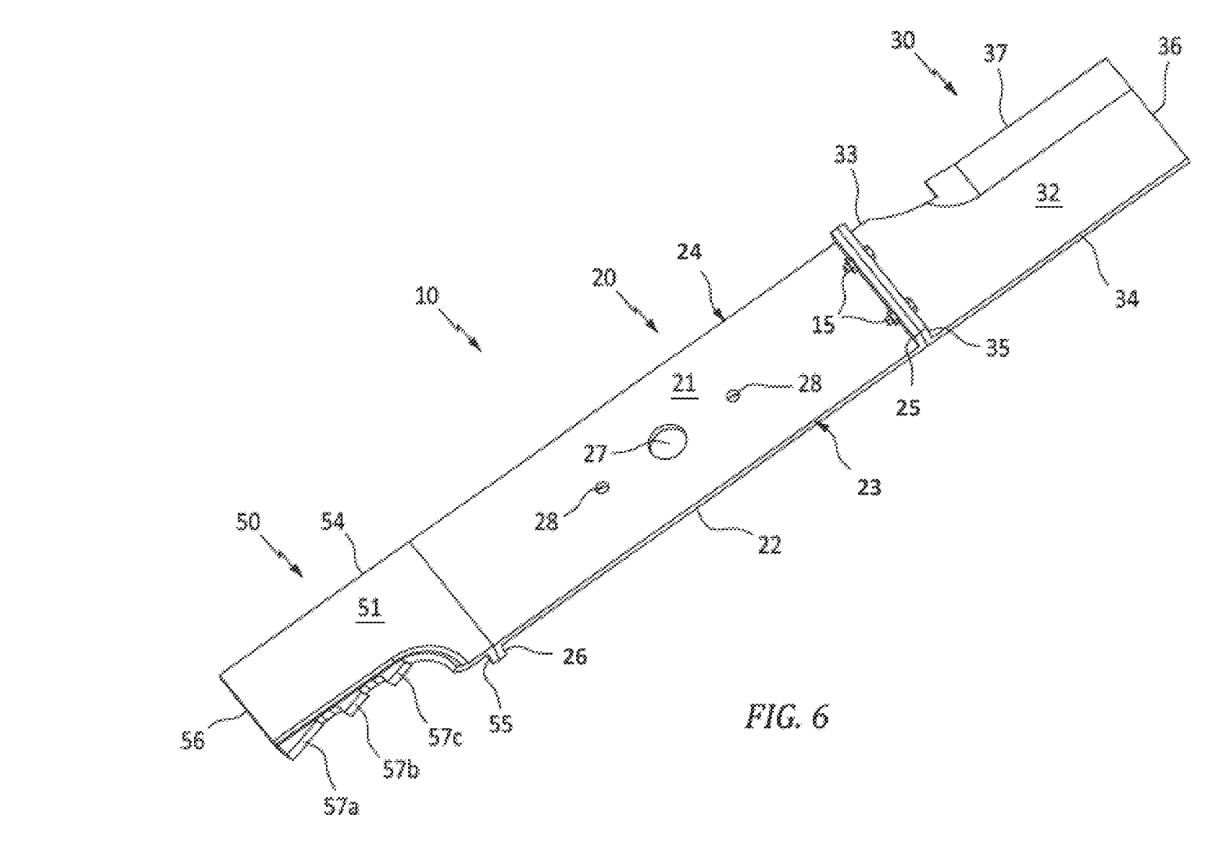
FIG. 6 is a perspective view of the mower blade with removable cutting attachment device, in accordance with one embodiment of the invention.

Although described above as using two identical cutting attachments, the inventive concepts are not so limiting. To this end, FIG. 6 illustrates one embodiment where dissimilar cutting attachments 30 and 50 are used together on the same frame 20. The cutting attachments will be aligned and connected in the same manner described above and allow a user to customize and optimize the device for a particular job or type of vegetation in a manner not possible with other systems.

Although described above as using two attachments with the frame, other embodiments are contemplated wherein only a single cutting attachment is used so as to extend outward from only one end of the frame.

Figure 7:
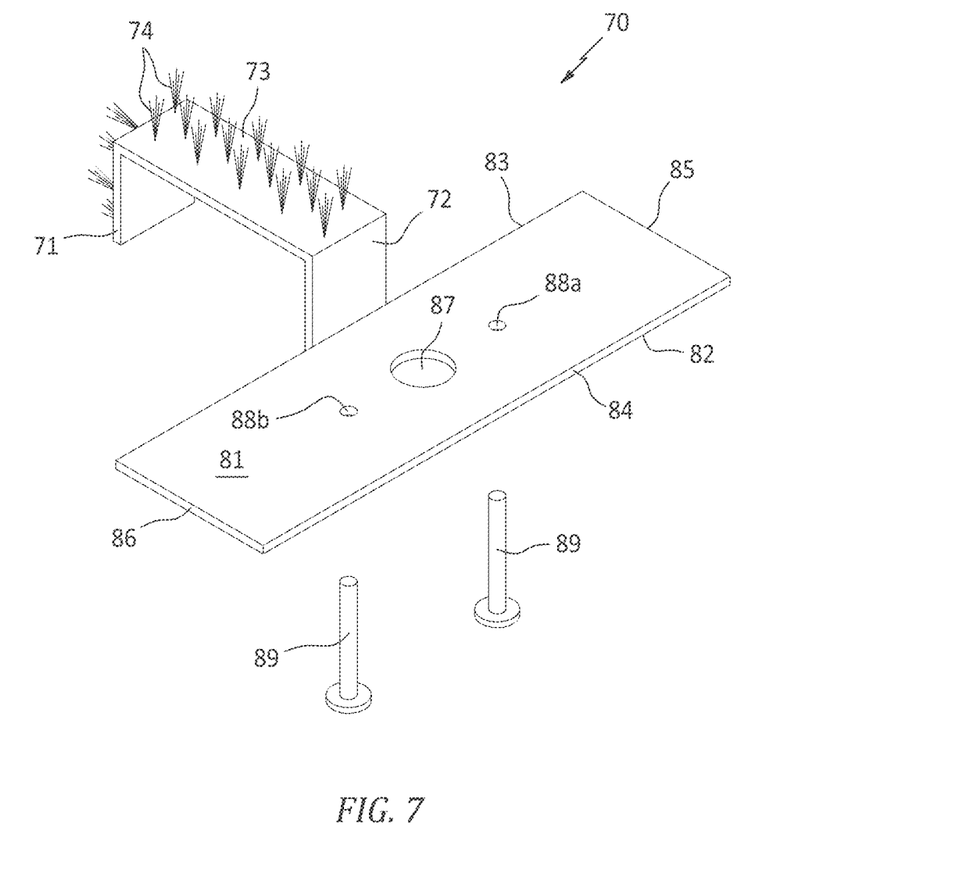
FIG. 7 is a perspective view of the brush cleaning attachment of the device, in accordance with one embodiment of the invention.
Figure 8:
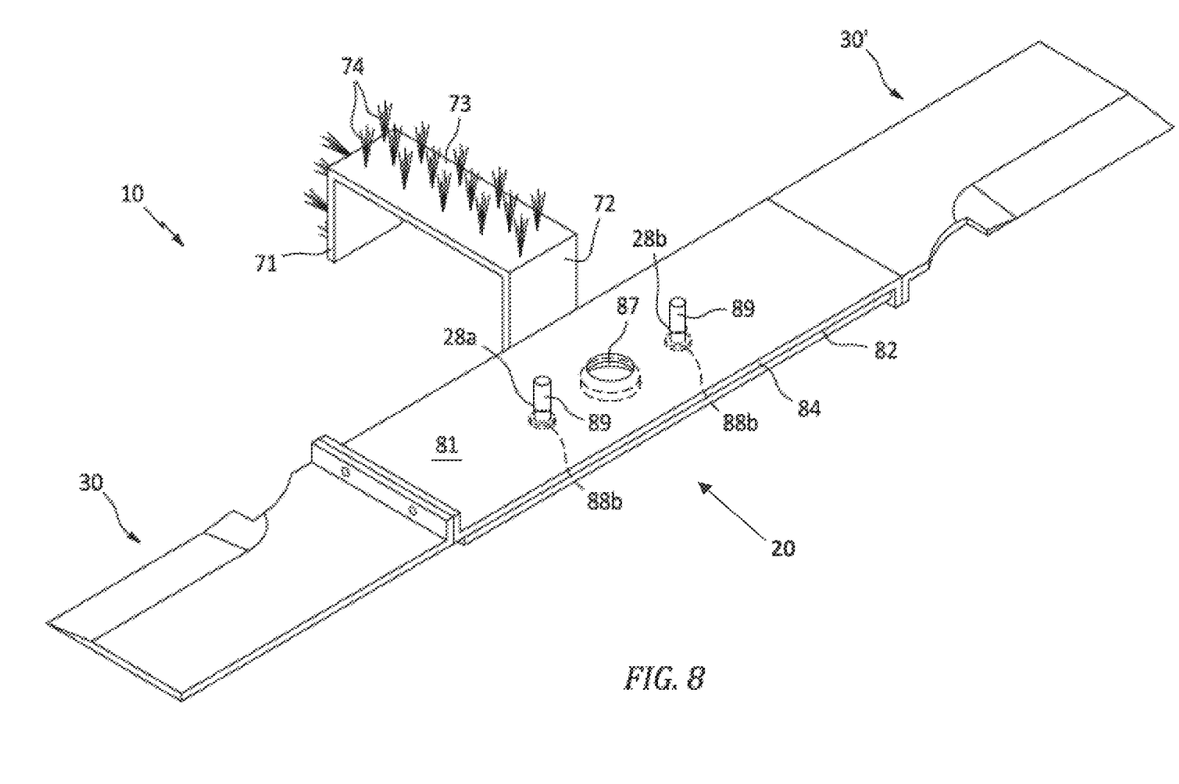
FIG. 8 is a perspective view of the device with the brush cleaning attachment installed, in accordance with one embodiment of the invention.

FIGS. 7 and 8 illustrate one embodiment of a cleaning brush attachment 70 which can be connected to the frame 20. As shown, the attachment 70 can include a generally n-shaped brush having an outer vertical bar 71, an inner vertical bar 72, a raised horizontal bar 73, and a plurality of bristles 74 extending outward from the horizontal bar and the outer vertical bar.

In one embodiment, the inner vertical bar can be attached centrally along one edge of an elongated frame attachment bracket so as to be perpendicular thereto. As shown, the frame attachment bracket can include a top surface 81, a bottom surface 82 an inside edge 83 and an outside edge 84, a first end 85, a second end 86. The bracket can also include a center hole 87 and a pair of side holes 88a and 88b.

In the preferred embodiment, the bracket can include a length (e.g., distance between ends 85 and 86) that is identical to the length (e.g., distance between inside edges of ends 25 and 26) of the frame 20. Likewise, openings 87, 88a and 88b can each include a shape, size and location on the bracket that is complementary to the shape, size and location of openings 27, 28a and 28b, respectively, along the frame 20.

As shown at FIG. 8, the top of the bracket can be positioned against the bottom end of the frame 20 such that respective openings are aligned. When so positioned, connectors 89 such as nuts and bolts, locking pins or other such hardware can be routed through the side openings 88a/28a and 88b/28b, respectively, in order to secure the cleaning brush to the frame. When in this configuration, and upon securing the frame to the mower in the manner described above, rotation of the frame causes the bristles to engage and clean the underside of the mower blade housing.

In this regard, it is noted that the cleaning attachment can be used without the cutting attachments connected to the frame, or with the cutting attachments connected to the frame, thus permitting simultaneous mowing and cleaning during operation of the lawn mower.

Accordingly, the above-described device provides users with the ability to quickly and easily replace or change cutting surfaces without having to remove the frame from the mower and without the waste associated with previous mower blades. Additionally, the device can clean the mower housing as noted above.

As described herein, one or more elements of the mower blade with removable cutting attachments 10 can be secured together utilizing any number of known attachment means such as, for example, screws, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A mower blade device, comprising:
a frame having a top surface, a bottom surface, a first edge, a second edge, a first end and a second end;
a first protrusion that is positioned along the first end of the frame, said first protrusion extending orthogonally from the top surface in a first direction;
a second protrusion that is positioned along the second end of the frame, said second protrusion extending orthogonally from the bottom surface in a second direction;
at least one hole that is positioned along the frame at a location between the first end and the second end;
a first cutting attachment having a first end that is removably connected to the first protrusion at a location adjacent to the top surface of the frame in the first direction; and
a second cutting attachment having a first end that is removably connected to the second protrusion at a location adjacent to the bottom surface of the frame in the second direction;

wherein the at least one hole is configured to receive a bolt for securing the frame onto a spindle of a lawn mower, wherein the first direction and the second direction are opposite to each other, and wherein each of the first cutting attachment, the second cutting attachment and the frame are aligned serially.

2. The device of claim 1, wherein each of the first cutting attachment and the second cutting attachment include a top surface, a bottom surface, a leading edge, a trailing edge, a first end and a second end.

3. The device of claim 2, wherein each of the first cutting attachment and the second cutting attachment include a sharp cutting surface positioned along the leading edge.

4. The device of claim 1, wherein the first cutting attachment and the second cutting attachment include an identical shape and size.

5. The device of claim 1, wherein the first end of the first cutting attachment includes a protrusion having a shape and a size that is complementary to a shape and a size of the first protrusion on the first end of the frame.

6. The device of claim 5, further comprising:
a first set of apertures located along the first protrusion on the first end of the frame; and
a second set of apertures located along the first end of the first cutting attachment,
wherein each of the first set of apertures and the second set of apertures include a complementary shape, size and location.

7. The device of claim 6, further comprising:
a first pair of connectors that are positioned through the first set of apertures and the second set of apertures.

8. The device of claim 1, wherein the first end of the second cutting attachment includes a protrusion having a shape and a size that is complementary to a shape and a size of the second protrusion on the second end of the frame.

9. The device of claim 8, further comprising:
a third set of apertures located along the second protrusion on the second end of the frame; and
a fourth set of apertures located along the first end of the second cutting attachment,
wherein each of the third set of apertures and the fourth set of apertures include a complementary shape, size and location.

10. The device of claim 9, further comprising:
a second pair of connectors that are positioned through the third set of apertures and the fourth set of apertures.

11. The device of claim 1, wherein the at least one hole includes a center hole and a pair of side holes.

12. The device of claim 11, wherein each of the side holes include an identical shape, and the center hole includes at least one of a shape or a size that is different from each of the side holes.

13. The device of claim 12, wherein the center hole includes at least one of a circular shape, a 6-star shape, a 5-star shape, a bow tie shape, or H pattern shape.

14. The device of claim 1, further comprising:
a cleaning brush attachment that is removably connected to the bottom surface of the frame.

15. The device of claim 14, wherein the cleaning brush attachment includes a plurality of bristles that are positioned above the top surface of the frame.

16. The device of claim 2, wherein the leading edge of the first cutting attachment is positioned parallel to the second edge of the frame.

17. The device of claim 16, wherein the leading edge of the second cutting attachment is positioned parallel to the first edge of the frame.

\* \* \* \* \*